(12) United States Patent
Sekizuka et al.

(10) Patent No.: US 8,226,115 B2
(45) Date of Patent: Jul. 24, 2012

(54) AIRBELT APPARATUS FOR VEHICLE

(75) Inventors: Makoto Sekizuka, Toyota (JP); Takuya Nezaki, Mizunami (JP); Atsushi Hiroshige, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 297 days.

(21) Appl. No.: 12/278,788

(22) PCT Filed: Feb. 5, 2007

(86) PCT No.: PCT/JP2007/051940
§ 371 (c)(1),
(2), (4) Date: Aug. 8, 2008

(87) PCT Pub. No.: WO2007/091526
PCT Pub. Date: Aug. 16, 2007

(65) Prior Publication Data
US 2010/0164207 A1    Jul. 1, 2010

(30) Foreign Application Priority Data

Feb. 9, 2006    (JP) .................................. 2006-032068

(51) Int. Cl.
    *B60R 21/18*    (2006.01)
(52) U.S. Cl. .......................... 280/733; 280/808; 297/483
(58) Field of Classification Search .................. 280/733, 280/801.1, 808; 297/473, 483
See application file for complete search history.

(56) References Cited

U.S. PATENT DOCUMENTS 3,844,001 A * 10/1974 Holmberg .................... 24/598.1
4,348,037 A *  9/1982 Law et al. ..................... 280/733

(Continued)

FOREIGN PATENT DOCUMENTS

DE    199 50 951 A1    4/2001

(Continued)

OTHER PUBLICATIONS

European Search Report for EP 07 708 058.8, dated Dec. 1, 2009.

(Continued)

*Primary Examiner* — Ruth Ilan
*Assistant Examiner* — Timothy Wilhelm
(74) *Attorney, Agent, or Firm* — Finnegan, Henderson, Farabow, Garrett & Dunner, LLP

(57) ABSTRACT

An objective is to inflate an inflation portion to an upward position, corresponding with a temple area of an occupant, at the time of a side impact. At a shoulder portion of a seatback 26 of a vehicle seat 12, there is an inflation-time cross-sectional shape regulation component 22, through which an occupant restraint webbing 16 passes. The occupant restraint webbing 16 has an inflation portion 18 that corresponds with a cephalic region 14H of an occupant 14 at the time of inflation. At the time of inflation of the inflation portion 18, the inflation-time cross-sectional shape regulation component 22 regulates such that a cross-sectional shape of the inflation portion 18 is an oblong shape which is long in a vertical direction. Therefore, an inflated shape of the inflation portion 18 is regulated by the inflation-time cross-sectional shape regulation component 22 at the time of the side impact, and the inflation portion 18 can be caused to inflate up to a position corresponding with a temple portion 14S of the occupant 14. Thus, inertial force in a vehicle lateral direction of the cephalic region 14H of the occupant 14 can be absorbed by the inflation portion 18.

11 Claims, 11 Drawing Sheets

U.S. PATENT DOCUMENTS

| | | | |
|---|---|---|---|
| 5,303,953 A * | 4/1994 | Kamiyama et al. | 280/733 |
| 5,390,953 A | 2/1995 | Tanaka et al. | |
| 5,829,841 A * | 11/1998 | Pywell et al. | 297/471 |
| 5,897,169 A * | 4/1999 | Larsen et al. | 297/483 |
| 6,279,945 B1 * | 8/2001 | Schneider et al. | 280/733 |
| 6,336,656 B1 * | 1/2002 | Romeo | 280/733 |
| 6,520,588 B1 * | 2/2003 | Busch | 297/483 |
| 6,547,273 B2 * | 4/2003 | Grace et al. | 280/733 |
| 6,749,223 B2 * | 6/2004 | Kazuo et al. | 280/801.1 |
| 7,862,080 B2 * | 1/2011 | Hiroshige et al. | 280/733 |
| 2002/0171233 A1 * | 11/2002 | Grace | 280/733 |

FOREIGN PATENT DOCUMENTS

| | | |
|---|---|---|
| JP | 6-144138 | 5/1994 |
| JP | 10-226295 | 8/1998 |
| JP | 3113081 | 9/2000 |
| JP | 2001-239906 | 9/2001 |
| JP | 2002-527282 | 8/2002 |
| WO | WO 98/00314 | 1/1998 |

OTHER PUBLICATIONS

Supplementary European Search Report dated Jun. 18, 2009.

\* cited by examiner

AIRBELT APPARATUS FOR VEHICLE

CROSS-REFERENCE TO RELATED APPLICATIONS

This application is a national phase application of International Application No. PCT/JP2007/051940, filed Feb. 5, 2007, and claims the priority of Japanese Application No. 2006-032068, filed Feb. 9, 2006, the contents of both of which are incorporated herein by reference.

TECHNICAL FIELD

The present invention relates to an airbelt apparatus for a vehicle, which includes an inflation portion that corresponds with a cephalic region of an occupant at a time of inflation.

BACKGROUND ART

A vehicle airbelt apparatus has been disclosed (see patent reference 1) in which an occupant restraint webbing with an inflation portion passes through a belt guide disposed at a shoulder portion of a seatback, and the inflation portion can be inflated by an inflator fixed to a seatback frame.
Patent reference 1: Japanese National Publication No. 2002-527282

DISCLOSURE OF INVENTION

Problem to be Solved by the Invention

However, in the above-mentioned conventional example, the inflation portion is pressed against the occupant by tension of the occupant restraint webbing, which increases when the inflation portion inflates. In addition, the inflation portion is regulated by the belt guide, which is formed to be horizontally long to match the occupant restraint webbing, and the inflation portion inflates to broaden in a horizontal direction, which is to say a vehicle lateral direction. Thus, it has been difficult for the inflation portion to be inflated to an upward position corresponding to a temple area of the occupant, as a response to a side impact.

In consideration of the circumstances described above, an objective of the present invention is to cause an inflation portion to inflate to an upward position corresponding with a temple area of an occupant at the time of a side impact.

Means for Solving the Problem

A first airbelt apparatus for a vehicle comprises an occupant restraint webbing that corresponds with a thoracic region of an occupant seated at a vehicle seat; an inflation portion that is provided at the occupant restraint webbing and that, at a time of inflation, corresponds with a cephalic region of the occupant; an inflator configured to supply gas for inflation to the inflation portion; a side impact sensor that detects or predicts a side impact; a control unit that causes the inflator to operate on the basis of an output signal from the side impact sensor; and an inflation-time cross-sectional shape regulation component that is provided at a shoulder portion of a seatback of the vehicle seat, through which the occupant restraint webbing passes, and that, at the time of inflation of the inflation portion, effects regulation such that a cross-sectional shape of the inflation portion is an oblong shape which is long in a vertical direction.

With the first airbelt apparatus, when a side impact toward a side of the occupant is detected or predicted by the side impact sensor, the inflator operates, a large quantity of gas is ejected from the inflator, and the inflation portion is inflated by the gas. At this time, the cross-sectional shape of the inflation portion is regulated, by the inflation-time cross-sectional shape regulation component, so as to be an oblong shape which is long in the vertical direction at the shoulder portion of the seatback, and the inflation portion inflates to sideward of the cephalic region of the occupant. Consequently, at the time of a side impact, it is possible to inflate the inflation portion to an upward position corresponding with a temple area of an occupant.

In a second airbelt apparatus, including all of the features of the first airbelt apparatus, the inflation-time cross-sectional shape regulation component is an inflation-time regulation belt guide at which an inflation-time regulation guide hole is provided, the guide hole having a elliptical shape that is longer in the vertical direction than in a vehicle lateral direction, so as to regulate the cross-sectional shape of the inflation portion at the time of inflation, and an upper end of the inflation-time regulation guide hole being provided so as to extend to a position sideward of a headrest of even height therewith.

With the second airbelt apparatus, the inflation-time regulation guide hole of the inflation-time regulation belt guide is formed with the substantially elliptical form which is longer in the vertical direction than in the vehicle lateral direction. Thus, at the time of inflation, the cross-sectional shape of the inflation portion is regulated by the inflation-time regulation guide hole so as to have the oblong shape which is long in the vertical direction. Further, the upper end of the inflation-time regulation guide hole is extended up to the position sideward of the headrest of even height therewith. Thus, the inflation portion can be inflated up to the height position sideward of the headrest. Accordingly, by the inflation portion being inflated to be oblong up to the height position sideward of the headrest, the inflation portion can be caused to inflate up to a height position corresponding with the temple area of an occupant.

A third airbelt apparatus, including all of the features of the second airbelt apparatus, also includes a normal-time regulation belt guide that is disposed in a region within the inflation-time regulation guide hole, and at which a normal-time regulation guide hole is provided which regulates a winding direction of the occupant restraint webbing passing therethrough at times of normal use, and that is expanded by inflation of the inflation portion.

With the third airbelt apparatus, at times of normal use, the winding direction of the occupant restraint webbing is regulated by the normal-time regulation belt guide. When the inflation portion is inflated, the normal-time regulation belt guide is deployed by the inflation, and thus the cross-sectional shape of the inflation portion is regulated by the inflation-time regulation belt guide so as to be the oblong shape which is long in the vertical direction.

Therefore, with the third airbelt apparatus, the winding direction of the occupant restraint webbing can be regulated by the normal-time regulation belt guide at times of normal use, in addition to which it is possible to improve protection characteristics of the cephalic region of an occupant at the time of a side impact.

In a fourth airbelt apparatus, including all of the features of the first airbelt apparatus, the inflation-time cross-sectional shape regulation component is a belt guide that is configured to be accommodated in the seatback at times of normal use and at which a normal-time regulation guide hole is formed that is configured to regulate a winding direction of the occupant restraint webbing passing therethrough between an upper end portion thereof and an upper edge portion of the shoulder portion in an accommodated state.

With the fourth airbelt apparatus, at times of normal use, the belt guide is accommodated in the seatback and the winding direction of the occupant restraint webbing is regulated by the normal-time regulation guide hole, which is formed between the upper end portion thereof and the upper edge portion of the seatback shoulder portion. When the inflation portion is inflated, the belt guide protrudes upward from the seatback shoulder portion and goes into a non-accommodated state, due to the inflation, and the guide hole broadens upward and becomes the inflation-time regulation guide hole. The cross-sectional shape of the inflation portion is regulated by this inflation-time regulation guide hole so as to be in the oblong shape which is long in the vertical direction at the seatback shoulder portion, and the inflation portion inflates to sideward of the cephalic region of the occupant.

Therefore, with the fourth airbelt apparatus, the winding direction of the occupant restraint webbing can be regulated by the normal-time regulation belt guide at times of normal use, in addition to which it is possible to improve protection characteristics of the cephalic region of an occupant at the time of a side impact.

In a fifth airbelt apparatus, including all of the features of the first airbelt apparatus, the inflation-time cross-sectional shape regulation component is a pair of guide half-pieces that are respectively supported at support points provided at an interval in a vehicle lateral direction, that are configured to overlap each other and to expand in opposite directions from each other about the support points.

With the fifth airbelt apparatus, the pair of guide half-pieces are maintained in an overlapped state at times of normal use, and thus the normal-time regulation guide hole is formed between them and the upper edge of the seatback shoulder portion. Winding of the occupant restraint webbing is regulated at times of normal use by this normal-time regulation guide hole. At the time of inflation of the inflation portion, the pair of guide half-pieces are expanded in mutually opposite directions about the support points by the inflation, and the guide hole broadens to upward of the seatback shoulder portion. The cross-sectional shape of the inflation portion is regulated by the guide hole that has broadened upward so as to be in the oblong shape which is long in the vertical direction at the seatback shoulder portion, and the inflation portion inflates to sideward of the cephalic region of the occupant.

Therefore, with the fifth airbelt apparatus, the winding direction of the occupant restraint webbing can be regulated by the pair of guide half-pieces in the overlapped state at times of normal use, in addition to which it is possible to improve protection characteristics of the cephalic region of an occupant at the time of a side impact.

In a sixth airbelt apparatus, including all of the features of the first airbelt apparatus, the inflation-time cross-sectional shape regulation component is a belt guide that elastically deforms, or turns about a support point provided at the shoulder portion, due to inflation of the inflation portion, and that is configured to expand within a predetermined range in a direction away from the cephalic region of the occupant.

With the sixth airbelt apparatus, the winding direction of the occupant restraint webbing is regulated at times of normal use by the non-deployed belt guide. At the time of inflation of the inflation portion, the belt guide is elastically deformed by this inflation or turns about the support point provided at the seatback shoulder portion, and deploys within the predetermined range in the direction away from the cephalic region of the occupant. Thus, a guide surface, which regulates the cross-sectional shape of the inflation portion to the oblong shape which is long in the vertical direction, is formed at the belt guide.

Therefore, with the sixth airbelt apparatus, the cross-sectional form of the inflation portion is regulated by the guide surface of the belt guide and forms the oblong shape which is long in the vertical direction at the seatback shoulder portion. Thus, the inflation portion inflates to sideward of the cephalic region of an occupant. Consequently, it is possible to improve protection characteristics of the cephalic region of the occupant at the time of a side impact.

In a seventh airbelt apparatus, including all of the features of any one of the first, second, third, fourth, fifth, or sixth airbelt apparatuses, the shoulder portion of the seatback, at which the inflation-time cross-sectional shape regulation component is provided, forms an inclined surface at which a distance from a vehicle lateral direction middle portion of the vehicle seat to an upper portion of the shoulder portion is smaller than the distance to a lower portion of the shoulder portion.

With the seventh airbelt apparatus, the seatback shoulder portion forms an outward-curving inclined surface. Thus, when the inflation portion is inflated, the inflation portion is drawn in toward the middle portion of the vehicle seat by an increase in tension of the occupant restraint webbing, in accordance with which the inflation portion rises up the inclined surface, and resultantly the inflation portion moves upward. As a result, the inflation portion can bodily approach the head portion of the occupant.

Effects of the Invention

As described above, with the first airbelt apparatus, an excellent effect is provided in that the inflation portion can be inflated to an upward position corresponding with a temple area of an occupant at the time of a side impact.

With the second airbelt apparatus, an excellent effect is provided in that the inflation portion is inflated to be oblong up to a height position sideward of the headrest, and thus the inflation portion can be inflated up to a height position corresponding with a temple area of an occupant.

With the third airbelt apparatus, an excellent effect is provided in that the winding direction of the occupant restraint webbing can be regulated by the normal-time regulation belt guide at times of normal use and in that protection characteristics of the cephalic region of an occupant at the time of a side impact can be further improved.

With the fourth airbelt apparatus, an excellent effect is provided in that the winding direction of the occupant restraint webbing can be regulated by the normal-time regulation guide hole of the accommodated belt guide at times of normal use and in that the cross-sectional shape of the inflation portion is regulated by the guide hole of the guide belt broadening upward at the time of a side impact and protection characteristics of the cephalic region of an occupant can be further improved.

With the fifth airbelt apparatus, an excellent effect is provided in that the winding direction of the occupant restraint webbing can be regulated by the pair of guide half-pieces in the overlapped state at times of normal use and in that the pair of guide half-pieces are deployed at the time of a side impact, the cross-sectional shape of the inflation portion is regulated and protection characteristics of the cephalic region of an occupant can be further improved.

With the sixth airbelt apparatus, an excellent effect is provided in that the cross-sectional form of the inflation portion is regulated by a guide surface of the belt guide and the inflation portion is inflated to sideward of the cephalic region of an occupant, and thus protection characteristics of the cephalic region of an occupant at the time of a side impact can be further improved.

With the seventh airbelt apparatus, an excellent effect is provided in that the inflation portion can bodily approach the head portion of the occupant at the time of a side impact.

BRIEF DESCRIPTION OF THE DRAWINGS

FIG. 1 is a front view showing a state in which a winding direction of an occupant restraint webbing is regulated by a first belt guide at a time of normal use, at which an occupant is seated on a vehicle seat and has applied the occupant restraint webbing.

FIG. 2 is an enlarged perspective view showing a state of regulation of the winding direction of the occupant restraint webbing by the first belt guide at a time of normal use.

FIG. 3 is a front view showing a state in which an inflation portion has inflated due to a side impact, the first belt guide has deployed due to inflation tension, a cross-sectional shape of the inflation portion has been regulated by the second belt guide, and the inflation portion has inflated to an oblong shape which is long in a vertical direction up to a height position corresponding with a temple area of the occupant.

FIG. 4 is a front view showing a state in which a winding direction of an occupant restraint webbing is regulated by a normal-time regulation guide hole of a belt guide, which is formed of guide pieces in an overlapped state, at a time of normal use, at which an occupant is seated on a vehicle seat and has applied the occupant restraint webbing.

FIG. 5 is an enlarged perspective view showing a state in which the winding direction of the occupant restraint webbing is restricted by the normal-time regulation guide hole of the belt guide which is formed of the guide pieces in the ovelapped state.

FIG. 6 is a front view showing a state in which an inflation portion has inflated due to a side impact, the belt guide formed of a pair of guide half-pieces has deployed due to inflation tension, a cross-sectional shape of the inflation portion has been regulated by the inflation-time regulation guide hole of the belt guide, and the inflation portion has inflated to an oblong shape which is long in a vertical direction up to a height position corresponding with a temple area of the occupant.

FIG. 7 is a front view showing a state in which a winding direction of an occupant restraint webbing is regulated by a belt guide at a time of normal use, at which an occupant is seated on a vehicle seat and has applied the occupant restraint webbing.

FIG. 8 is a front view showing a state in which an inflation portion has inflated due to a side impact, the belt guide has deployed due to inflation tension and a vehicle lateral direction inflation amount of the inflation portion has been regulated by the belt guide, in addition to which the inflation portion has been lifted up by an inclined surface of a seatback and the inflation portion has inflated to an oblong shape which is long in a vertical direction up to a height position corresponding with a temple area of the occupant.

FIG. 9 is a perspective view showing a state in which a second belt guide is accommodated and a winding direction of an occupant restraint webbing is regulated by a first belt guide and the second belt guide, at a time of normal use, at which an occupant is seated on a vehicle seat and has applied the occupant restraint webbing.

FIG. 10 is a front view showing a state in which an inflation portion has inflated due to a side impact, the first belt guide has deployed due to inflation tension and the second belt guide has protruded upward, a cross-sectional shape of the inflation portion has been regulated by the second belt guide, and the inflation portion has inflated to an oblong shape which is long in a vertical direction up to a height position corresponding with a temple area of the occupant.

FIG. 11 is a perspective view showing a vertical sliding mechanism provided in a seatback.

BEST MODE FOR CARRYING OUT THE INVENTION

Herebelow, exemplary embodiments of the present invention will be described on the basis of the drawings.

First Exemplary Embodiment

Figure 1:
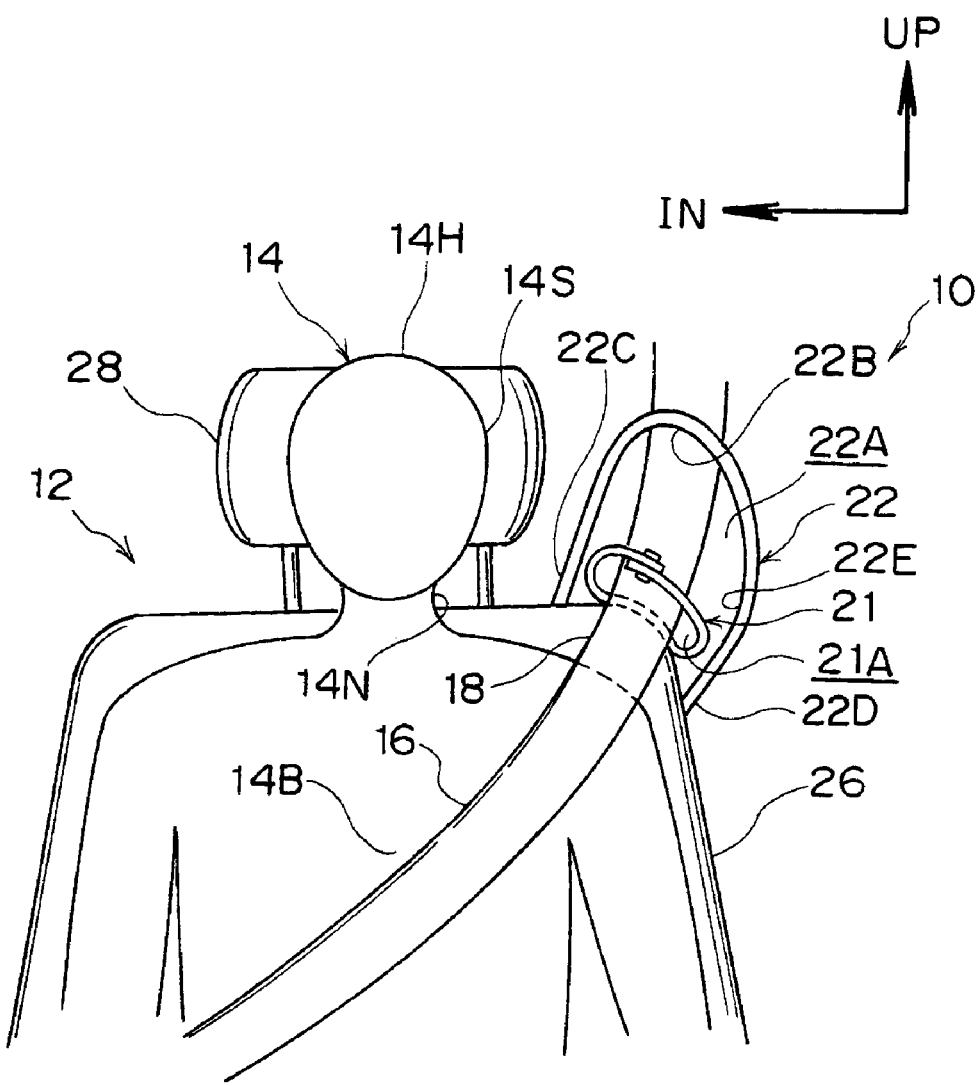
FIG. 1 to FIG. 3 relate to a first exemplary embodiment.

In FIG. 1, a vehicle airbelt apparatus 10 relating to the present exemplary embodiment is a type of seat belt for restraining an occupant 14 who is sitting at a vehicle seat 12, and has: an occupant restraint webbing 16, an inflation portion 18, an inflator (not shown), a side impact sensor (not shown), a control unit (not shown), a first belt guide 21, which is an example of a normal-time regulation belt guide, and a second belt guide 22, which is an example of an inflation-time cross-sectional shape regulation component.

The vehicle seat 12 has a seat cushion (not shown) at which the occupant 14 sits, a seatback 26 which supports the back of the occupant 14, and a headrest 28 which is provided at the seatback 26 and corresponds with a cephalic region 14H of the occupant 14.

A lapbelt anchor is provided at a vehicle cabin outer side side portion of the seat cushion, and an unillustrated buckle apparatus is provided at a vehicle cabin middle side side portion of the seat cushion. Here, positions of provision of the lapbelt anchor and the buckle apparatus are not limited to the seat cushion and may be, for example, at a floor panel side. A gas supply source for the inflation portion 18, for example, an inflator, is disposed inside the buckle apparatus or at an exterior portion of the buckle apparatus (not shown). The control unit operates the inflator when a side impact is detected by the side impact sensor or a side impact is predicted by an unillustrated pre-crash sensor.

Here, in a case in which the inflation portion 18 is also made to correspond with a thoracic region 14B of the occupant 14, the inflator is also operated when a front impact is detected or predicted. In such a case, a front impact inflator and a side impact inflator may be separately utilized, or this may correspond to a single inflator whose output is variable.

The occupant restraint webbing 16 is a belt corresponding with the chest portion 14B of the occupant 14, and is configured to be windable onto a retractor (not shown) which is disposed, for example, at an upper back panel of the vehicle. At a time of sitting by the occupant 14, the occupant restraint webbing 16 can be drawn out from the retractor to fit the physique of the occupant 14. Here, at times of normal use, the occupant restraint webbing 16 is guided by the first belt guide 21 such that a winding direction thereof is regulated.

A tongue plate (not shown), which is configured to be fittable into the buckle apparatus, is provided at the occupant restraint webbing 16. When the tongue plate has been fitted into the buckle apparatus, gas from the inflator can be supplied to the inflation portion 18 from the buckle apparatus side.

The inflation portion 18 is a bag which is provided at the occupant restraint webbing 16 and is folded up so as to correspond with the cephalic region 14H of the occupant 14 at a time of inflation. Specifically, the inflation portion 18 is folded up into a belt form similar to the occupant restraint webbing 16 and is covered with, for example, a mesh webbing with extensibility (not shown) and further covered with a cover (not shown). The inflation portion 18 is stitched into the belt form using control stitching, known as a tear seam, that ruptures when an internal pressure in the inflation portion 18 is at or above a certain value. A region of deployment of the inflation portion 18 is not limited to positions corresponding with the cephalic region 14H of the occupant 14; it may inflate to correspond as far as the chest portion 14B.

Figure 2:
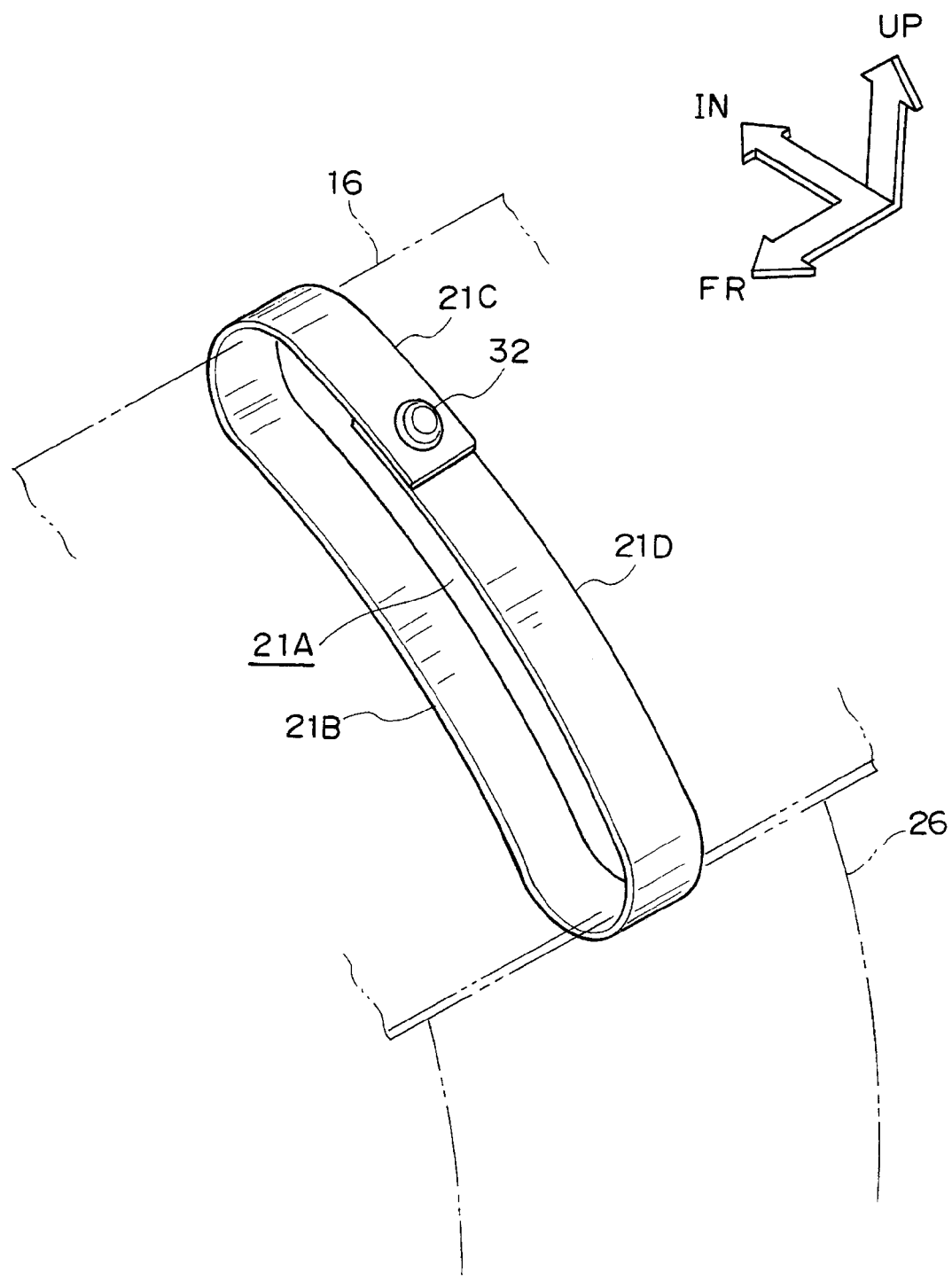

In FIG. 1 and FIG. 2, the first belt guide 21 is disposed at a region within an inflation-time regulation guide hole 22A of the second belt guide 22, which will be described below. The first belt guide 21 is provided with a normal-time regulation guide hole 21A which regulates the winding direction of the occupant restraint webbing 16 passing therethrough at times of normal use. The first belt guide 21 is structured so as to deploy with inflation of the inflation portion 18. Specifically, as shown in FIG. 1, the first belt guide 21 is a flexible member provided at a shoulder portion of the seatback 26 in a region that is within the inflation-time regulation guide hole 22A of the second belt guide 22 in a front view of the vehicle. The normal-time regulation guide hole 21A is formed to be wide in a lateral direction of the occupant restraint webbing 16 and short in a thickness direction of the occupant restraint webbing 16, for guiding at times of normal use.

As shown in FIG. 2, at the first belt guide 21, a bottom portion 21B which extends in the lateral direction of the occupant restraint webbing 16 is fixed to the shoulder portion of the seatback 26 using stitching, clips or the like. Upper pieces 21C and 21D are provided extending from two length direction ends of the bottom portion 21B. In a state in which the upper pieces 21C and 21D are folded over and formed into a flat loop shape with end portions thereof overlapping, the end portions are fastened together by, for example, a button 32. Thus, the normal-time regulation guide hole 21A is formed which is long in the lateral direction and short in the thickness direction of the occupant restraint webbing 16. Here, components for fastening the upper pieces 21C and 21D are not limited to the button 32 and any components may be used as long as it is a structure with which the upper pieces 21C and 21D can be separated from one another by inflation force of the inflation portion 18 and the first belt guide 21 can deploy, such as a hook, a surface fastener, stitching with a tear seam, or the like. Alternatively, the first belt guide 21 may be formed in a loop form without a seam, at which a rupture preparation portion is provided in an upper piece, and the first belt guide 21 may be deployed by the rupture preparation portion rupturing due to inflation force when the inflation portion 18 is inflated.

In FIG. 1, the second belt guide 22 is provided at the shoulder portion of the seatback 26 of the vehicle seat 12, and the occupant restraint webbing 16 passes therethrough. The second belt guide 22 is an inflation-time regulation belt guide which regulates a cross-sectional shape of the inflation portion 18, at a time of inflation of the inflation portion 18, so as to be an oblong shape which is long in the vertical direction. The second belt guide 22 is longer in the vertical direction than the vehicle lateral direction, and is provided with the inflation-time regulation guide hole 22A having a substantially elliptical shape in which an upper end 22B is provided extending as far as a height position sideward of the headrest 28. The second belt guide 22 extends from an end portion 22C, which is fixed at the seat middle side relative to the first belt guide 21 of the seatback 26, to an end portion 22D, which is fixed at a position beyond the first belt guide 21. As shown in FIG. 1, the second belt guide 22 extends upward and to the vehicle lateral direction outer side from the end portion 22C to the upper end 22B of the inflation-time regulation guide hole 22A, extends downward and to the vehicle lateral direction outer side from the upper end 22B to an outer end 22E, and extends downward and toward the seat middle from the outer end 22E to the end portion 22D. In order to regulate the cross-sectional shape of the inflation portion 18 to be oblong, it is desirable that a position of the outer end 22E does not project much to the vehicle lateral direction outer side and is, for example, disposed at the seat middle side relative to a maximum width position of the seatback 26.

Thus, the second belt guide 22 forms an arch shape protruding diagonally upward from the shoulder portion of the seatback 26, and at times of normal use, can also be used as a handle when operating the seatback 26.

Here, the shape of the second belt guide 22 is not limited to the illustrated shape, and may be any shape which can regulate the cross-sectional shape of the inflation portion 18 to an oblong shape which is long in the vertical direction at a time of inflation. Further, in a case in which the second belt guide 22 can regulate winding of the occupant restraint webbing 16 at times of normal use and can also perform the function of the first belt guide 21, the first belt guide 21 need not be provided.

—Operation—

In FIG. 1, at the vehicle airbelt apparatus 10, at times of non-inflation of the inflation portion 18, that is, at times of normal use, the winding direction of the occupant restraint webbing 16 is regulated by the first belt guide 21, and the occupant restraint webbing 16 can be guided by the first belt guide 21. Further, at times of normal use, the second belt guide 22 is usable as a handle portion at times of mounting/dismounting, times of operation of the seatback 26 and the like.

Figure 3:
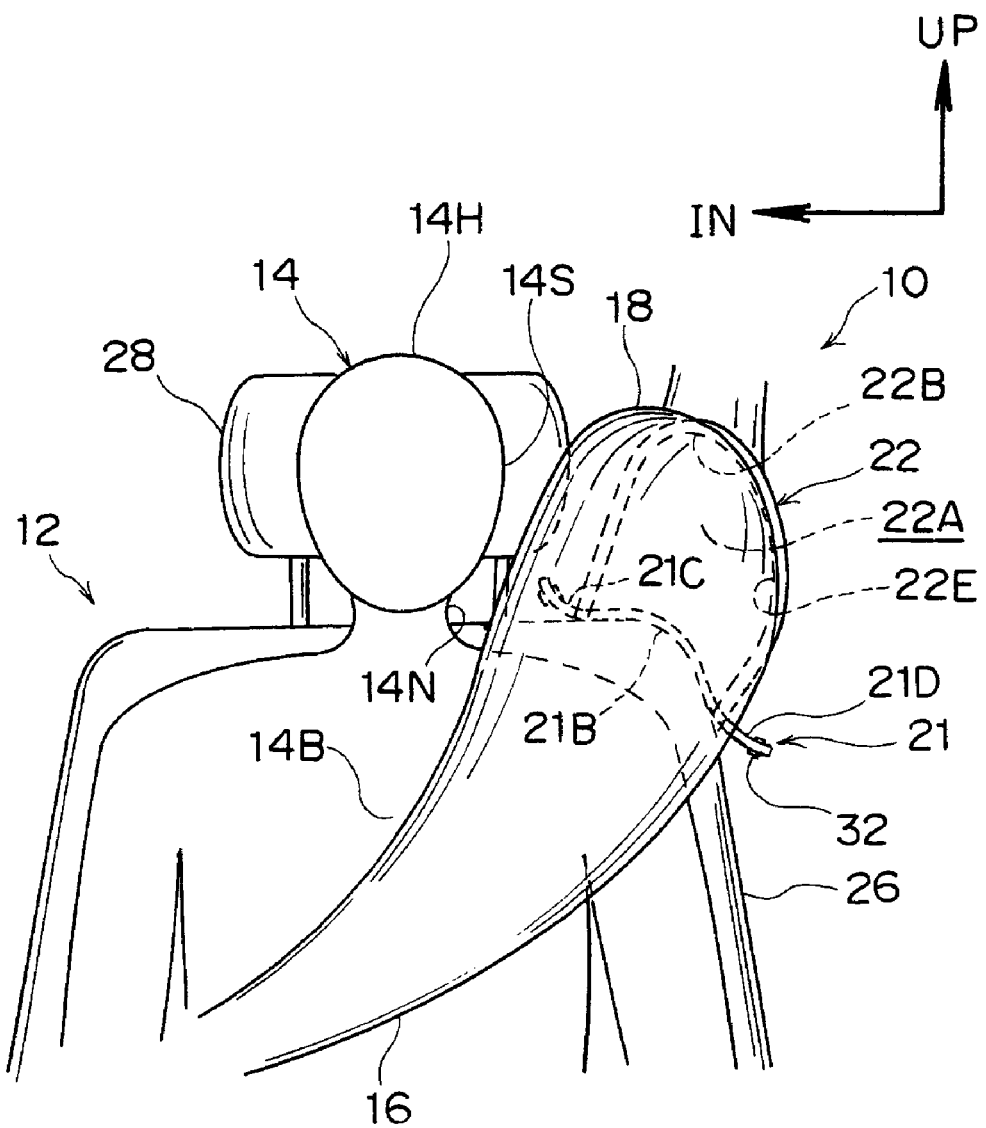

In a state in which the occupant restraint webbing 16 is applied, if a side impact is received from the side of the vehicle at which the occupant is sitting or such an impact is predicted, the inflator operates and, as shown in FIG. 3, the inflation portion 18 inflates. At this time, the button 32 of the first belt guide 21 is disengaged by inflation force of the inflation portion 18, and the upper pieces 21C and 21D move away from each other and deploy. Accordingly, an inflated shape of the inflation portion 18 is regulated by the inflation-time regulation guide hole 22A of the second belt guide 22 and, at the position of the second belt guide 22, the cross-sectional shape of the inflation portion 18 forms an oblong shape which is long in the vertical direction up to a height position sideward of the headrest 28.

Thus, with the vehicle airbelt apparatus 10, the winding direction of the occupant restraint webbing 16 is regulated by the first belt guide 21 at times of normal use, in addition to which, at the time of a side impact, the inflated shape of the inflation portion 18 is regulated by the second belt guide 22 and the inflation portion 18 can be inflated up to a height position corresponding with a temple area 14S of the occupant 14. Thus, inertial force of the cephalic region 14H of the occupant 14 in the vehicle lateral direction can be absorbed by the inflation portion 18. Because the inflation portion 18 is inflated to be oblong at a position corresponding with the temple area 14S, a broad region, for example, from a neck area 14N to the cephalic region 14H can be protected, and thus cephalic region protection characteristics are more excellent.

Second Exemplary Embodiment

Figure 4:
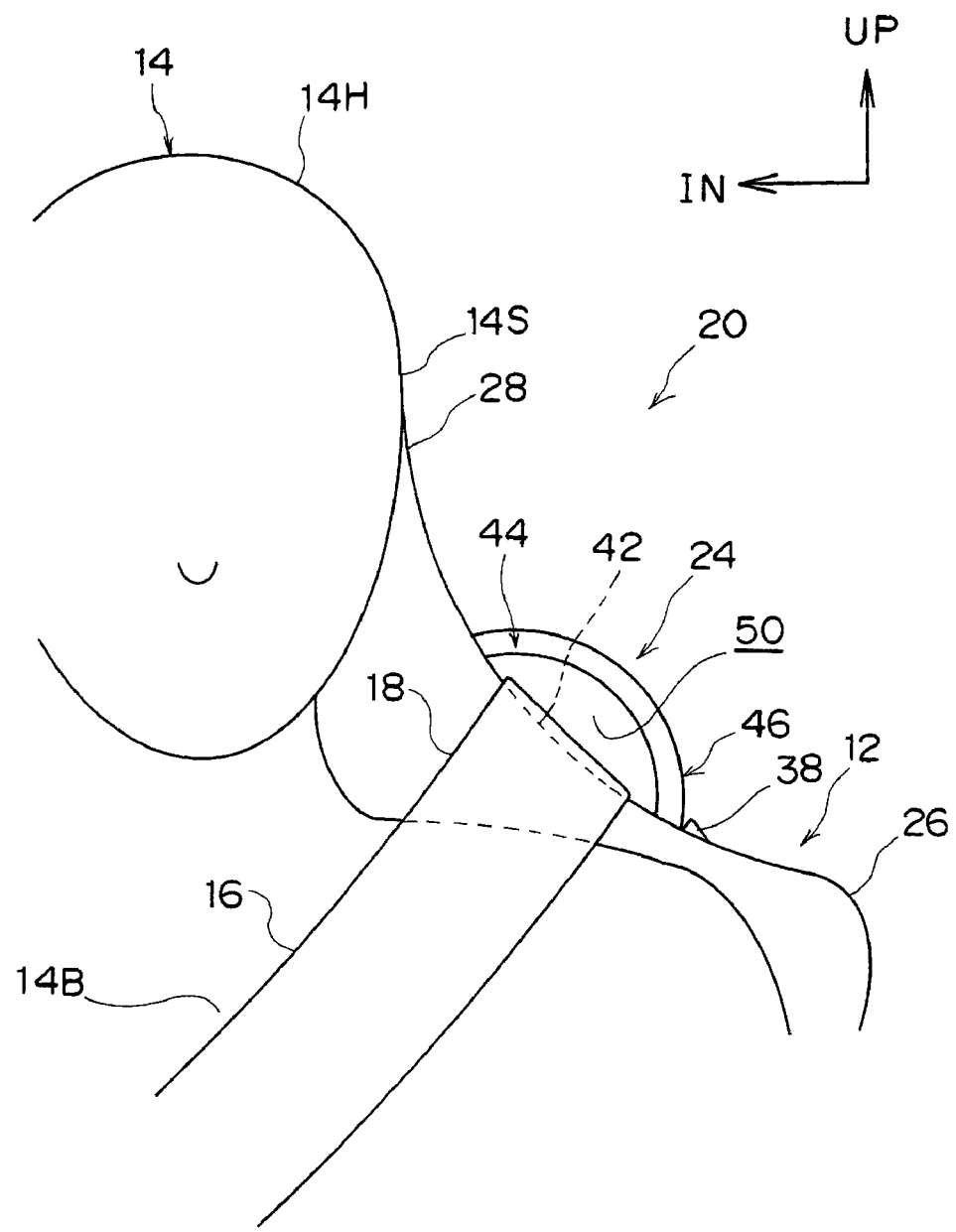
FIG. 4 to FIG. 6 relate to a second exemplary embodiment.
Figure 5:
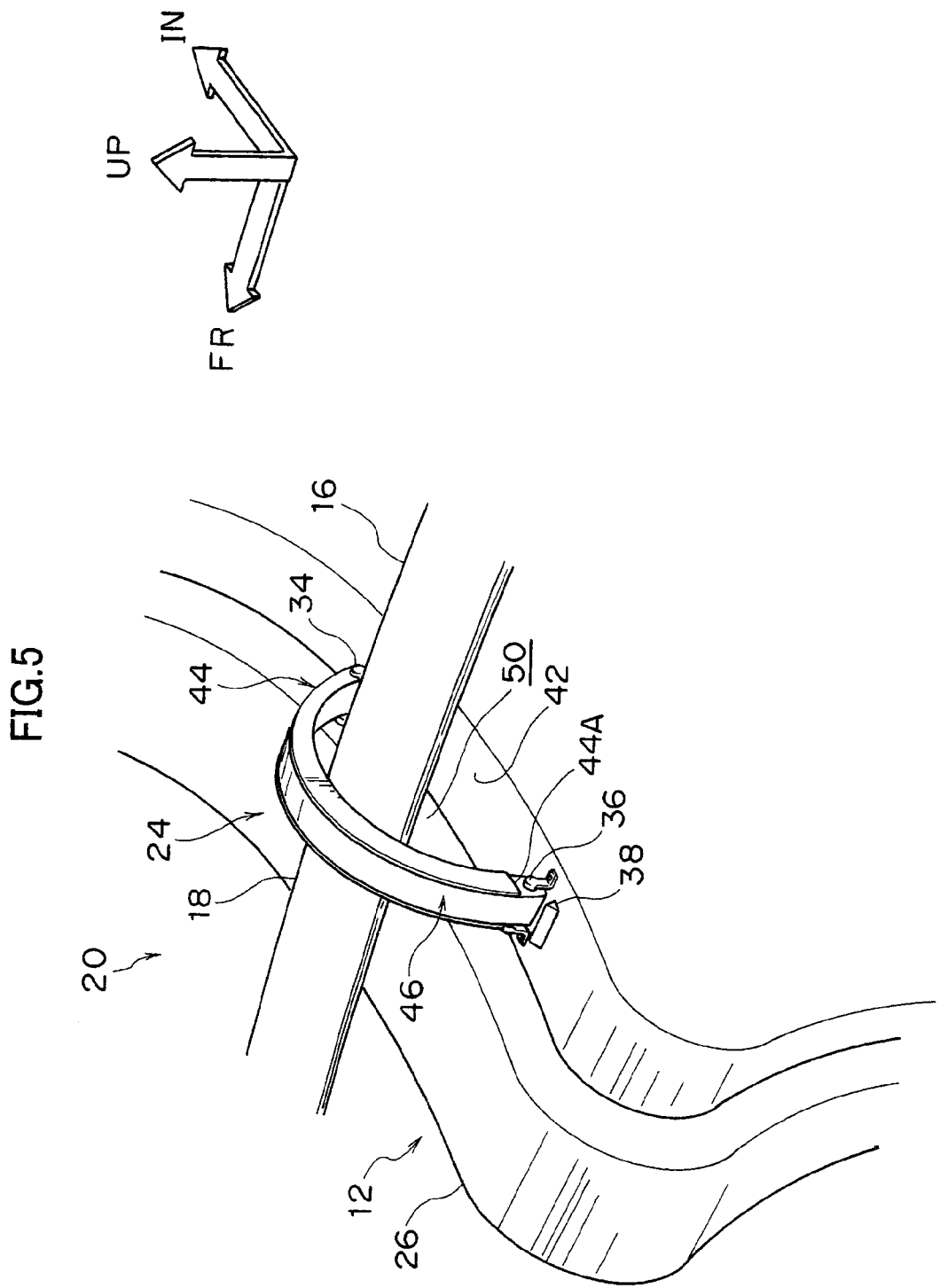

In FIG. 4 and FIG. 5, a vehicle airbelt apparatus 20 relating to the present exemplary embodiment is provided with a belt guide 24 which serves as an inflation-time cross-sectional shape regulation component. The belt guide 24 has a pair of guide half-pieces 44 and 46, which are pivoted respectively at a support point 34 provided at an interval in the vehicle lateral direction, are configured to overlap each other, and can be expanded in opposite directions from each other about the support points 34 and 36. The guide half-piece 44 is pivoted at the support point 34, at the seat middle side, and the guide half-piece 46 is pivoted at the support point 36, at the vehicle lateral direction outer side relative to the support point 34.

The pair of guide half-pieces 44 and 46 are, for example, respectively formed in circular arc shapes in a front view of the vehicle, and the guide half-piece 46 is formed with a slightly larger radius of curvature than the guide half-piece 44 such that the guide half-piece 46 can be overlapped onto the guide half-piece 44. Further, the guide half-piece 44 is formed with, for example, a "U"-shaped cross-section which opens upward, such that the guide half-piece 46 can be overlapped by being fitted into the opening portion.

In the present exemplary embodiment, for example, the headrest 28 is formed integrally with the seatback 26, and the pair of guide half-pieces 44 and 46 are formed at an inclined surface 42 that extends from the headrest 28 to the shoulder portion of the seatback 26. A stopper 38 is provided at the shoulder portion of the seatback 26, which restricts further turning when the guide half-piece 46 has turned through a predetermined angle. The restricting of the range of turning of the guide half-piece 46 is for restraining inflation of the inflation portion 18 to the vehicle lateral direction outer side, and causing the inflation portion 18 to inflate further upward. Here, a structure of the stopper 38 is not limited to the illustrated structure. For example, a structure may be formed such that a protruding portion is provided at the guide half-piece 46 side, and the protruding portion abuts against the shoulder portion of the seatback 26 when the guide half-piece 46 has turned through the predetermined angle, and thus restricts further turning.

Figure 6:
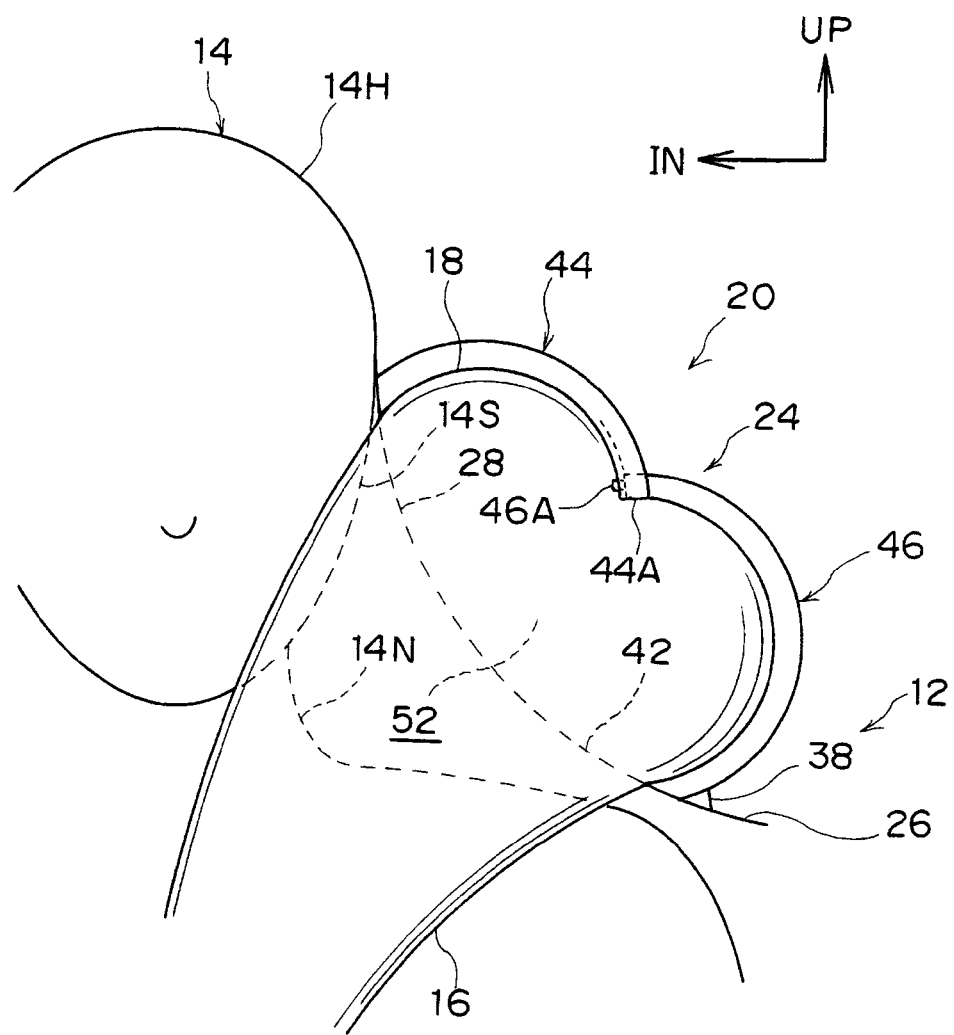

As shown in FIG. 6, distal ends 44A and 46A of the guide half-pieces 44 and 46 are structured so as to engage with one another when the belt guide 24 is deployed. Accordingly, at a time of inflation, an inflation-time regulation guide hole 52 is formed, which regulates the cross-sectional shape of the inflation portion 18. The engagement of the distal ends 44A and 46A may utilize any components as long as the form can withstand inflation force of the inflation portion 18.

Here, at times of normal use, it is desirable to maintain the guide half-pieces 44 and 46 in an overlapped state. For this, components are utilized that, for example, anchors the guide half-pieces 44 and 46 to a degree that will be disengaged by inflation force of the inflation portion 18, or that urges the guide half-pieces 44 and 46 in directions of overlap with a elastic body (not shown) that will be deformed by the inflation force. The components for maintaining the guide half-pieces 44 and 46 in the overlapped state are not limited to these.

In order to restrain inflation of the inflation portion 18 to the vehicle lateral direction outer side at a time of inflation, the guide half-piece 46 desirably has stiffness to a level that will not be deformed by the inflation force of the inflation portion 18. The guide half-piece 44 may have a lower stiffness than the guide half-piece 46, with a certain degree of deformation being allowed. If the guide half-piece 44 deforms, the inflation portion 18 can deploy upward by a corresponding amount, and cephalic region protection characteristics are consequently broadened.

In the present exemplary embodiment, the seatback 26 and the headrest 28 are integrally formed, but this is not a limitation and, as in the first exemplary embodiment, the headrest 28 and the seatback 26 may be separate bodies. Moreover, the guide half-pieces 44 and 46 are in the overlapped state at times of normal use but the guide half-pieces 44 and 46 may be, for example, disposed in a row one behind the other. Further, the belt guide 24 has one pair of the guide half-pieces 44 and 46 but may have plural pairs of guide half-pieces.

Other portions are the same as in the first exemplary embodiment. Thus, portions that are the same are assigned the same reference numerals in the drawings and will not be described.

—Operation—

As shown in FIG. 5, when the guide half-piece 46 is overlapped on the guide half-piece 44, a substantially semi-circular normal-time regulation guide hole 50 is formed at the belt guide 24. As shown in FIG. 4, the winding direction of the occupant restraint webbing 16 can be regulated at times of normal use by the normal-time regulation guide hole 50. Consequently, a sense of application when the occupant 14 applies the occupant restraint webbing 16 is excellent.

In the state in which the occupant restraint webbing 16 has been applied, if a side impact is received from the side of the vehicle at which the occupant is sitting or such an impact is predicted, the inflator operates and, as shown in FIG. 6, the inflation portion 18 inflates. At this time, the pair of guide half-pieces 44 and 46 turn in respectively opposite directions about the support points 34 and 36 and expand due to inflation force of the inflation portion 18. The guide half-piece 46 deploys until it abuts against the stopper 38, and the guide half-piece 44 deploys until the distal end 44A engages with the distal end 46A. The expansion of the belt guide 24 is ended by the distal ends 44A and 46A engaging with one another, and the cross-sectional shape of the inflation portion 18 is regulated by the inflation-time regulation guide hole 52 that is formed accordingly. Inflation of the inflation portion 18 to the vehicle lateral direction outer side is restrained by the range of turning of the guide half-piece 46 being restricted by the stopper 38. Meanwhile, because the guide half-piece 44 turns upward with the support point 34 serving as a support point, a region of the inflation-time regulation guide hole 52 that is close to the cephalic region 14H broadens upward. While the inflation portion 18 approaches the temple area 14S along the shape of the inflation-time regulation guide hole 52 and is lifted up by the inclined surface 42, the inflation portion 18 inflates upward from the shoulder portion of the seatback 26, up to a height position corresponding with the temple area 14S.

Thus, with the vehicle airbelt apparatus 20, the winding direction of the occupant restraint webbing 16 can be regulated by the compactly overlapped guide half-pieces 44 and 46 at times of normal use. Thus, appearance is better. Moreover, during inflation of the inflation portion 18, the guide half-pieces 44 and 46 that were overlapped at times of normal use deploy, the inflation portion 18 is caused to inflate up to a height position corresponding with the temple area 14S of the occupant 14 by the inflation-time regulation guide hole 52 that is accordingly formed, and a stable shape can be maintained within the inflation-time regulation guide hole 52. Thus, inertial force of the cephalic region 14H of the occupant 14 in the vehicle lateral direction is absorbed by the inflation portion 18 and, for example, from the neck area 14N up to the cephalic region 14H can be protected.

Third Exemplary Embodiment

Figure 7:
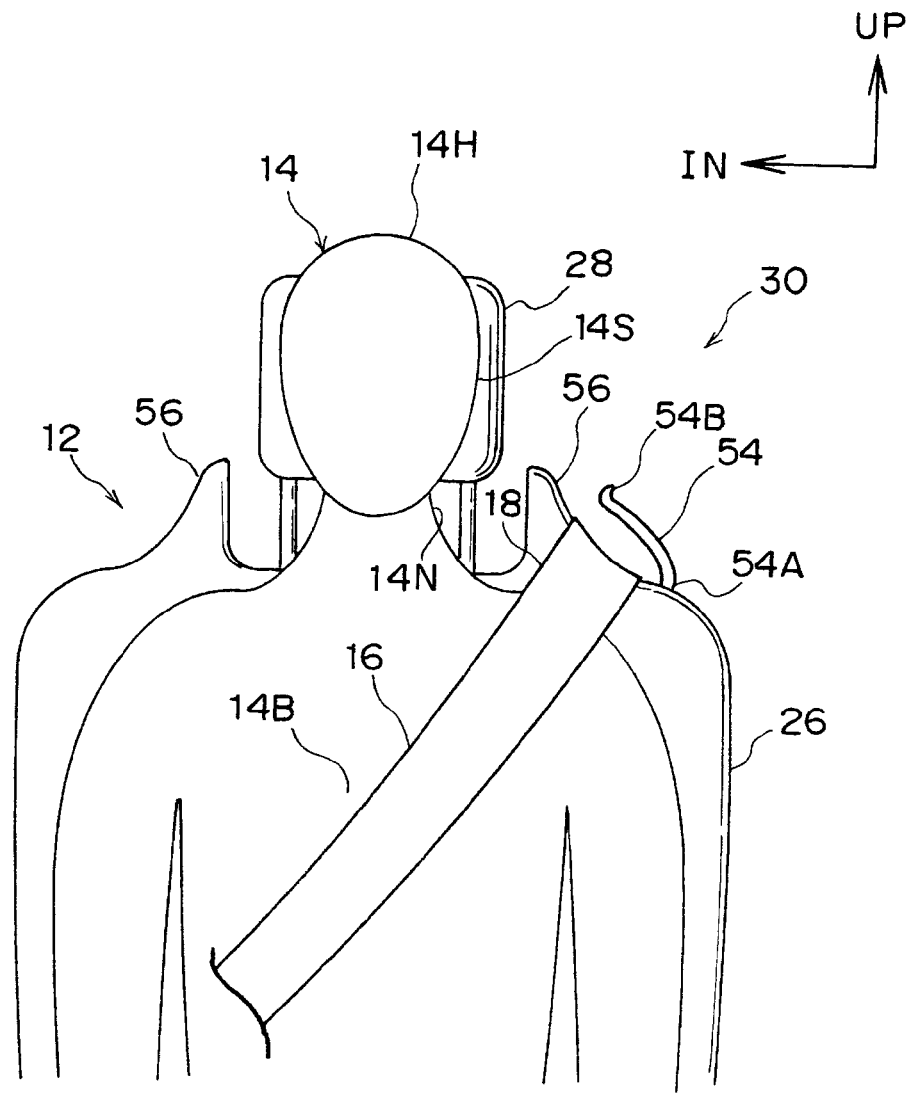
FIG. 7 and FIG. 8 relate to a third exemplary embodiment.
Figure 8:
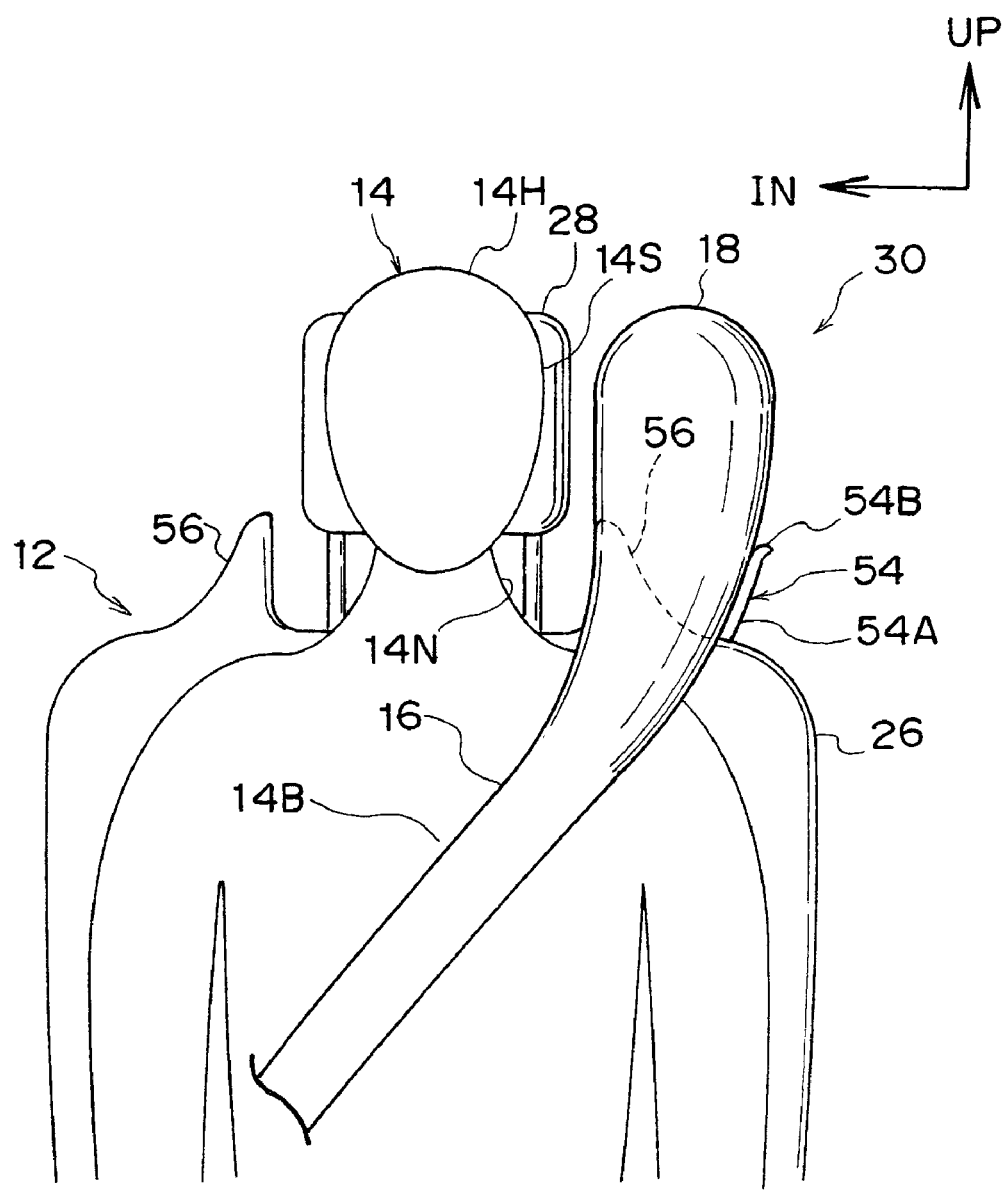

In FIG. 7 and FIG. 8, a vehicle airbelt apparatus 30 relating to the present exemplary embodiment has, as the inflation-time cross-sectional shape regulation component, a belt guide 54 at the shoulder portion of the seatback 26, which elastically deforms due to inflation of the inflation portion 18 and can deploy within a predetermined range in the direction away from the cephalic region 14H of the occupant 14. The range of deployment of the belt guide 54 is restricted in order to restrain inflation of the inflation portion 18 to the vehicle lateral direction outer side and cause the inflation portion 18 to inflate further upward.

In the present exemplary embodiment, for example, an inclined surface 56 that is angled upward toward the seat middle is formed at the shoulder portion of the seatback 26. A root portion 54A of the belt guide 54 is supported at a lower portion of the inclined surface 56, and it extends diagonally upward to a distal end 54B in a cantilever state, substantially parallel with the inclined surface 56, with a length equal to, for example, a width dimension of the occupant restraint webbing 16. At times of normal use, the occupant restraint webbing 16 passes through between the belt guide 54 and the inclined surface 56, and the winding direction is regulated. The distal end 54B of the belt guide 54 is separated from the inclined surface 56 to an extent such that the occupant restraint webbing 16 can be unhooked.

Here, it is desirable if a gradient of the inclined surface 56 is as large as possible, for causing the inflation portion 18 to deploy in an oblong manner. Further, the belt guide 54 may be capable of deploying in the direction away from the cephalic region 14H of the occupant 14 with inflation of the inflation portion 18, by turning about a support point (not shown) provided at the shoulder portion of the seatback 26.

Other portions are the same as in the first exemplary embodiment. Thus, portions that are the same are assigned the same reference numerals in the drawings and will not be described.

—Operation—

As shown in FIG. 7, with the vehicle airbelt apparatus 30 relating to the present exemplary embodiment, at times of normal use, the winding direction of the occupant restraint webbing 16 can be regulated by the belt guide 54 in the state which is substantially parallel with the inclined surface 56, and a sense of application when the occupant 14 seated on the vehicle seat 12 has applied the occupant restraint webbing 16 is excellent.

In the state in which the occupant restraint webbing 16 is applied, if a side impact is received from the side of the vehicle at which the occupant is sitting or such an impact is predicted, the inflator operates and, as shown in FIG. 8, the inflation portion 18 inflates. At this time, the belt guide 54 elastically deforms due to inflation force of the inflation portion 18, and deploys in the direction away from the cephalic region 14H of the occupant 14. The belt guide 54 deploys to an extent of being, for example, substantially parallel with the vehicle vertical direction, and further deployment is restricted by an unillustrated stopper or the like.

Because inflation of the inflation portion 18 to the vehicle lateral direction outer side is restrained by the belt guide 54, the inflation portion 18 acts to inflate toward the seat middle and upward along the belt guide 54. At this time, when the inflation portion 18 acts to inflate toward the seat middle, the inflation portion 18 is lifted up further by the inclined surface 56 provided at the seatback 26, and thus easily inflates to a height position corresponding with the temple area 14S of the occupant 14.

Thus, with the vehicle airbelt apparatus 30, at the time of a side impact, inflation of the inflation portion 18 to the vehicle lateral direction outer side can be restrained by the belt guide 54, in addition to which the inflation portion 18 can be caused to inflate to the height position corresponding with the temple area 14S of the occupant 14, by utilizing the inclined surface 56 provided at the seatback 26. Inertial force of the cephalic region 14H of the occupant 14 in the vehicle lateral direction is absorbed by the inflation portion 18, and protection of the cephalic region 14H is enabled.

Fourth Exemplary Embodiment

Figure 9:
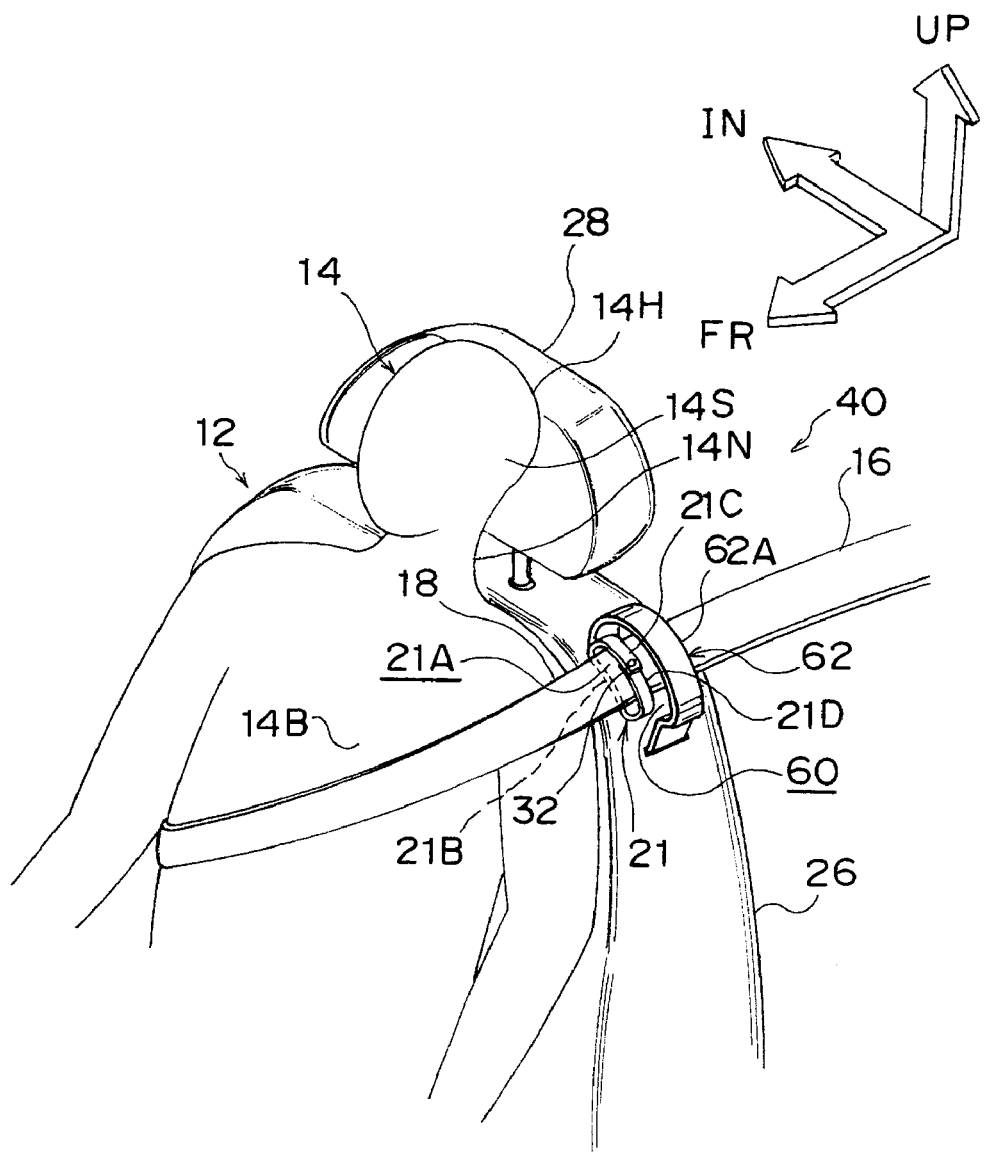
FIG. 9 to FIG. 11 relate to a fourth exemplary embodiment.

In FIG. 9, a vehicle airbelt apparatus 40 relating to the present exemplary embodiment has, in addition to the first belt guide 21 of the first exemplary embodiment, a second belt guide 62 which can be accommodated in the seatback 26.

Figure 11:
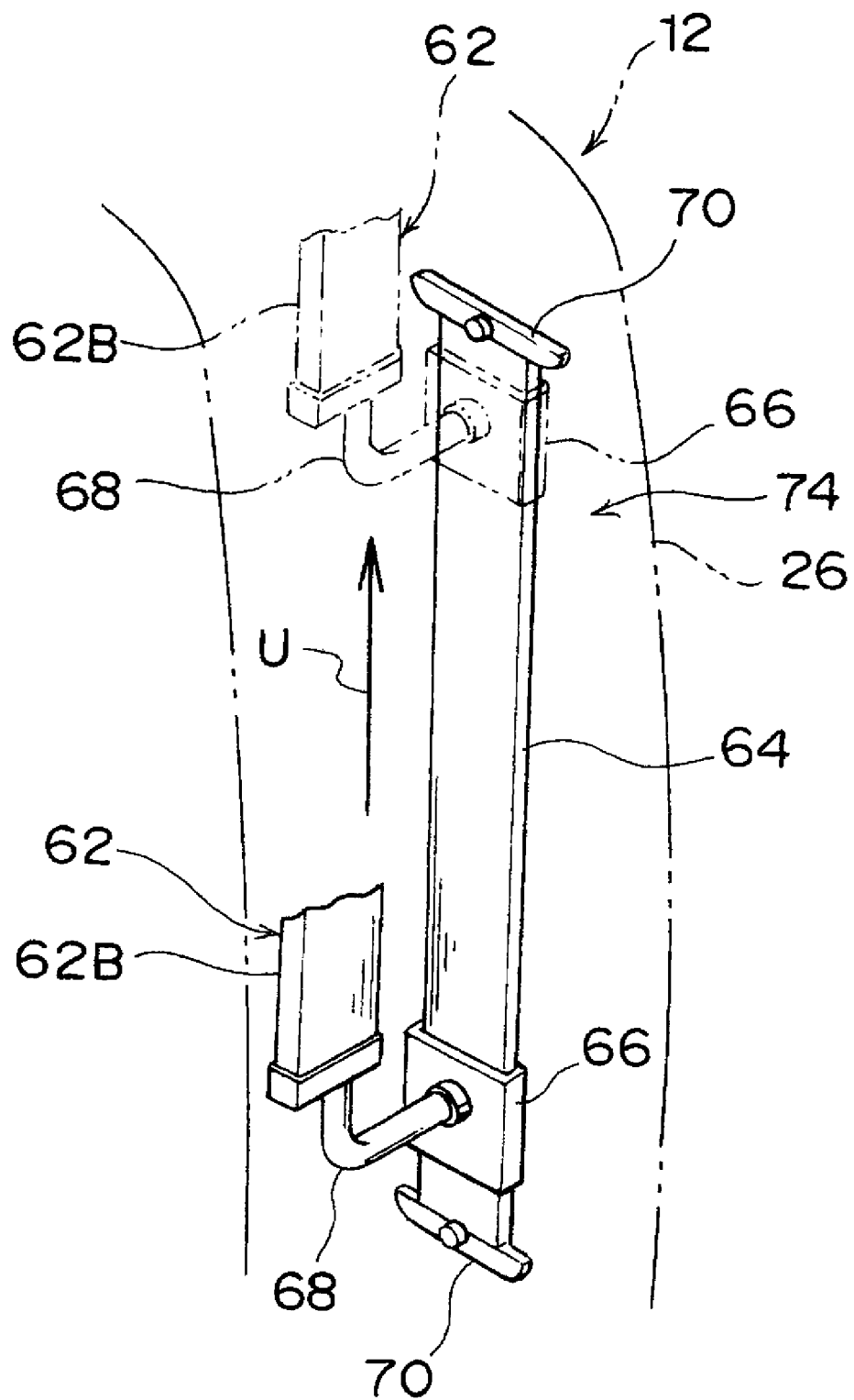

The second belt guide 62 is configured to be accommodated within the seatback 26 at times of normal use, and so as to form a normal-time regulation guide hole 60, through which the occupant restraint webbing 16 passes between an upper end portion 62A thereof and an upper edge portion of the shoulder portion of the seatback 26, and which is configured to regulate the winding direction thereof. As shown in FIG. 11, a vertical sliding mechanism 74 is provided in the seatback 26, which, for example, enables sliding of the second belt guide 62 in the vertical direction of the seatback 26. The second belt guide 62 is structured so as to be lifted up by the inflation portion 18 and protrude upward at a time of inflation of the inflation portion 18, and form an inflation-time regulation belt guide.

Specifically, in the seatback 26, a rail 64 is provided extending along, for example, the vertical direction of the seatback 26. A leg portion 62B of the second belt guide 62 is mounted via, for example, an L-shaped mounting bracket 68 to a slider 66 which is slidable on the rail 64 within a range of upper and lower stoppers 70. In FIG. 11, the vertical sliding mechanism 74 is shown for one of the leg portions 62B, but it is desirable if the vertical sliding mechanism 74 is provided thus at the leg portions 62B at both sides, in order for the second belt guide 62 to be lifted up smoothly at a time of inflation of the inflation portion 18.

As shown in FIG. 9, the first belt guide 21 is provided adjacent and parallel to the front side of the second belt guide 62. Thus, deployment of the first belt guide 21 is not obstructed by the second belt guide 62.

Here, in a case in which winding of the occupant restraint webbing 16 will be regulated at times of normal use by the normal-time regulation guide hole 60 of the second belt guide 62 alone, the first belt guide 21 need not be provided.

Other portions are the same as in the first exemplary embodiment. Thus, portions that are the same are assigned the same reference numerals in the drawings and will not be described.

—Operation—

As shown in FIG. 9, with the vehicle airbelt apparatus 40, at times of normal use, the winding direction of the occupant restraint webbing 16 can be regulated by the normal-time regulation guide hole 21A of the first belt guide 21 and the normal-time regulation guide hole 60 of the second belt guide 22, and a sense of application when the occupant 14 seated on the vehicle seat 12 has applied the occupant restraint webbing 16 is excellent.

Figure 10:
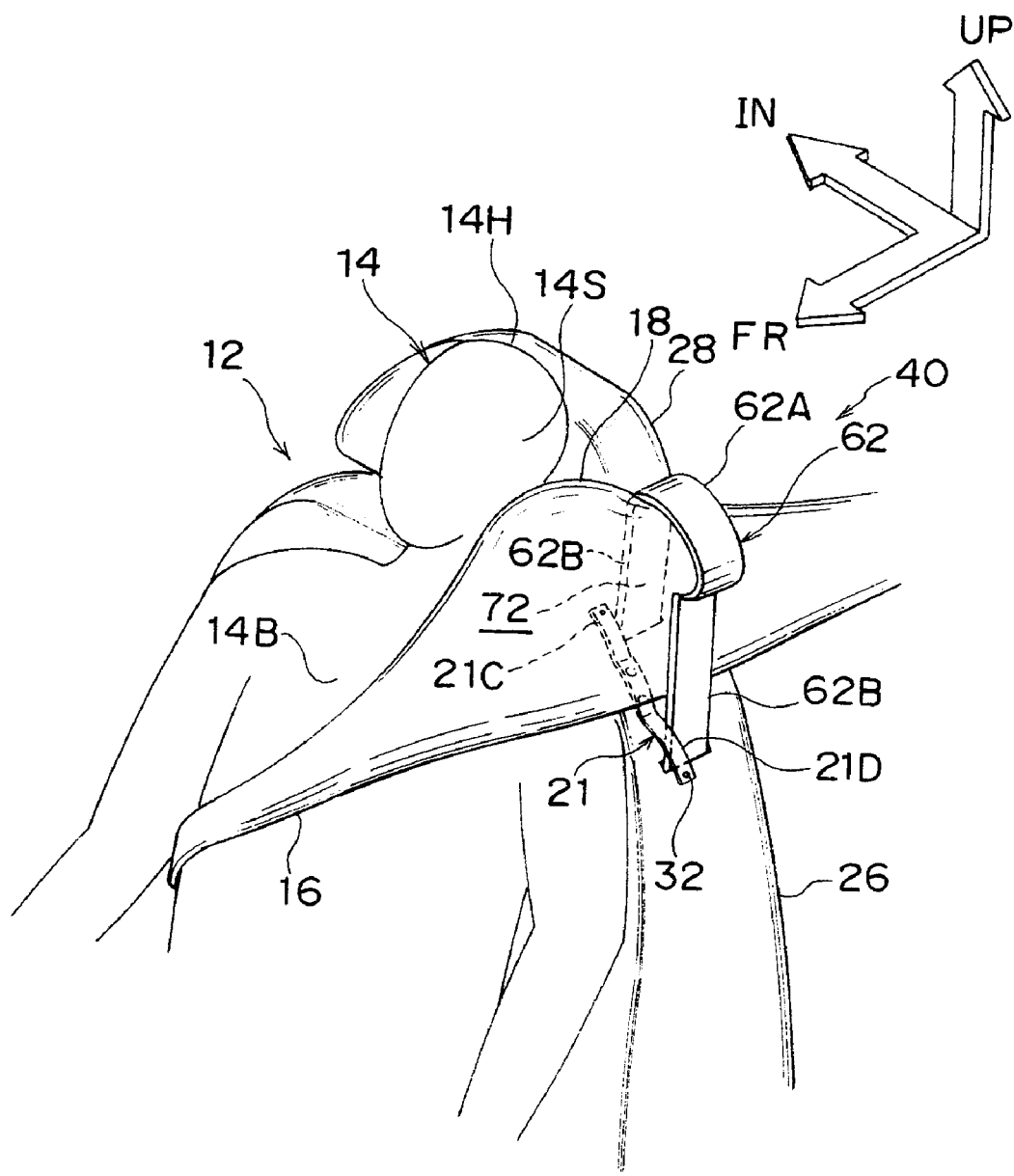

In the state in which the occupant restraint webbing 16 is applied, if a side impact is received from the side of the vehicle at which the occupant is sitting or such an impact is predicted, the inflator operates and, as shown in FIG. 10, the inflation portion 18 inflates. At the first belt guide 21, the button 32 is disengaged by inflation force of the inflation portion 18, and the upper pieces 21C and 21D move away from each other and deploy. Because the first belt guide 21 is provided adjacent to and parallel with the front side of the second belt guide 62, deployment of the first belt guide 21 will not be obstructed by the second belt guide 62.

At the second belt guide 62, as shown in FIG. 11, the slider 66 to which the leg portion 62B is mounted via the mounting bracket 68 slides in the direction of arrow U on the rail 64. Thus, as shown in FIG. 10, the second belt guide 62 protrudes upward and goes into a non-accommodated state, and an inflation-time regulation guide hole 72 is broadened upward.

This inflation-time regulation guide hole 72 is formed in an oblong shape which is long in the vertical direction. Thus, the cross-sectional shape of the inflation portion 18, which is regulated by the inflation-time regulation guide hole 72, is also an oblong shape which is long in the vertical direction, and the inflation portion 18 goes into a state which is inflated to a height position corresponding with the temple area 14S of the occupant 14.

Thus, with the vehicle airbelt apparatus 40, the winding direction of the occupant restraint webbing 16 can be regulated by the first belt guide 21 and the second belt guide 62 in an accommodated state at times of normal use, in addition to which, at the time of a side impact, an inflated shape of the inflation portion 18 can be regulated by the second belt guide 62 and the inflation portion 18 inflated to the height position corresponding with the temple area 14S of the occupant 14. Thus, inertial force of the cephalic region 14H of the occupant 14 in the vehicle lateral direction can be absorbed by the inflation portion 18. Because the inflation portion 18 is inflated to be oblong at a position corresponding with the temple area 14S, a broad region, for example, from the neck area 14N to the cephalic region 14H can be protected, and thus cephalic region protection characteristics are more excellent.

For the present exemplary embodiment, an exemplary embodiment which uses the first belt guide 21 and the second belt guide 62 in combination has been described, but this is not a limitation. The second belt guide 62 alone may be used by itself, and the winding direction of the occupant restraint webbing 16 may be regulated by the normal-time regulation guide hole 60 of the second belt guide 62 at times of normal use.

Furthermore, in any of the exemplary embodiments described above, because inflation of the inflation portion 18 to the vehicle lateral direction outer side is restrained while the cross-sectional form at the time of inflation is regulated to an oblong shape which is long in the vertical direction, a volume of the inflation portion 18 can be set to be comparatively small. Accordingly, a folded thickness of the inflation portion 18 can be restrained. Therefore, operation characteristics of the occupant restraint webbing 16 at times of normal use will be excellent.

EXPLANATION OF REFERENCE NUMERALS

10 Vehicle airbelt apparatus
12 Vehicle seat
14 Occupant
14B Thoracic region
14H Cephalic region
14S Temple area
16 Occupant restraint webbing
18 Inflation portion
20 Vehicle airbelt apparatus
21 First belt guide (normal-time regulation belt guide)
21A Normal-time regulation guide hole
22 Second belt guide (an inflation-time cross-sectional shape regulation component, inflation-time regulation belt guide)
22A Inflation-time regulation guide hole
22B Upper end
24 Belt guide (an inflation-time cross-sectional shape regulation component)
26 Seatback
28 Headrest
30 Vehicle airbelt apparatus
34 Support point
36 Support point
40 Vehicle airbelt apparatus
42 Inclined surface
44 Guide half-piece (an inflation-time cross-sectional shape regulation component)
44A Distal end
46 Guide half-piece (an inflation-time cross-sectional shape regulation component)
46A Distal end
50 Normal-time regulation guide hole
52 Inflation-time regulation guide hole
54 Belt guide (an inflation-time cross-sectional shape regulation component)
56 Inclined surface
60 Normal-time regulation guide hole
62 Second belt guide (an inflation-time cross-sectional shape regulation component, inflation-time regulation belt guide)
62A Upper end portion
72 Inflation-time regulation guide hole
74 Vertical sliding mechanism

The invention claimed is:

1. An airbelt apparatus for a vehicle, comprising:
an occupant restraint webbing that corresponds with a thoracic region of an occupant seated at a vehicle seat;
an inflation portion that is provided at the occupant restraint webbing and that, at a time of inflation, corresponds with a cephalic region of the occupant;
an inflator configured to supply gas for inflation to the inflation portion;
a side impact sensor that detects or predicts a side impact;
a control unit that causes the inflator to operate on the basis of an output signal from the side impact sensor; and
an inflation-time cross-sectional shape regulation component that is provided at a shoulder portion of a seatback of the vehicle seat, through which the occupant restraint webbing passes, and that, by restraining inflation of the inflation portion to a vehicle lateral direction outer side at the time of inflation of the inflation portion, effects regulation such that a cross-sectional shape of the inflation portion is longest in a vertical direction;
wherein the inflation-time cross-sectional shape regulation component is an inflation-time regulation belt guide at which an inflation-time regulation guide hole is provided, the guide hole having an elliptical shape that is longer in the vertical direction than in a vehicle lateral direction, so as to regulate the cross-sectional shape of the inflation portion at the time of inflation, and an upper end of the inflation-time regulation guide hole is provided so as to extend to a position sideward of a headrest of even height therewith.

2. An airbelt apparatus for a vehicle, comprising:
an occupant restraint webbing that corresponds with a thoracic region of an occupant seated at a vehicle seat;
an inflation portion that is provided at the occupant restraint webbing and that, at a time of inflation, corresponds with a cephalic region of the occupant;
an inflator configured to supply gas for inflation to the inflation portion;
a side impact sensor that detects or predicts a side impact;
a control unit that causes the inflator to operate on the basis of an output signal from the side impact sensor; and
an inflation-time cross-sectional shape regulation component that is provided at a shoulder portion of a seatback of the vehicle seat, through which the occupant restraint webbing passes, and that, by restraining inflation of the inflation portion to a vehicle lateral direction outer side at the time of inflation of the inflation portion, effects regulation such that a cross-sectional shape of the inflation portion is longest in a vertical direction;
wherein the inflation-time cross-sectional shape regulation component is an inflation-time regulation belt guide at which an inflation-time regulation guide hole is provided, the guide hole having an elliptical shape that is longer in the vertical direction than in a vehicle lateral direction, so as to regulate the cross-sectional shape of the inflation portion at the time of inflation, and an upper end of the inflation-time regulation guide hole is provided so as to extend to a position sideward of a headrest of even height therewith; and
further comprising a normal-time regulation belt guide that is disposed in a region within the inflation-time regulation guide hole, and at which a normal-time regulation guide hole is provided which regulates a winding direction of the occupant restraint webbing passing therethrough at times of normal use, and that is expanded by inflation of the inflation portion.

3. The airbelt apparatus for a vehicle of claim 2,
wherein the inflation portion also corresponds with the thoracic region of the occupant at the time of inflation.

4. The airbelt apparatus for a vehicle of claim 2, wherein the normal-time regulation belt guide is configured to be accommodated in the seatback at times of normal use and at which the normal-time regulation guide hole is formed that is configured to regulate the winding direction of the occupant restraint webbing passing therethrough between an upper end portion thereof and an upper edge portion of the shoulder portion in an accommodated state.

5. The airbelt apparatus for a vehicle of claim 2,
wherein the shoulder portion of the seatback, at which the inflation-time cross-sectional shape regulation component is provided, forms an inclined surface at which a distance from a vehicle lateral direction middle portion of the vehicle seat to an upper portion of the shoulder portion is smaller than the distance to a lower portion of the shoulder portion.

6. The airbelt apparatus for a vehicle of claim 4, wherein a vertical sliding mechanism is provided at a leg portion of the normal-time regulation belt guide such that the normal-time regulation belt guide is lifted up by the inflation portion at the time of inflation of the inflation portion.

7. An airbelt apparatus for a vehicle, comprising:
an occupant restraint webbing that corresponds with a thoracic region of an occupant seated at a vehicle seat;
an inflation portion that is provided at the occupant restraint webbing and that, at a time of inflation, corresponds with a cephalic region of the occupant;
an inflator configured to supply gas for inflation to the inflation portion;
a side impact sensor that detects or predicts a side impact;
a control unit that causes the inflator to operate on the basis of an output signal from the side impact sensor; and
an inflation-time cross-sectional shape regulation component that is provided at a shoulder portion of a seatback of the vehicle seat, through which the occupant restraint webbing passes, and that restrains inflation of the inflation portion to a vehicle lateral direction outer side at the time of inflation of the inflation portion, wherein:
the inflation-time cross-sectional shape regulation component is a pair of guide half-pieces that are respectively supported at support points provided at an interval in the vehicle lateral direction, and that are configured to overlap each other and to expand in opposite directions from each other about the support points; and
one of the guide half-pieces is a separate component from the other one of the guide half-pieces.

8. The airbelt apparatus for a vehicle of claim 7, wherein distal ends of the guide half-pieces are structured so as to engage with one another when restraining inflation of the inflation portion.

9. The airbelt apparatus for a vehicle of claim 7, wherein the guide half-pieces are maintained in an overlapped state at times of normal use.

10. An airbelt apparatus for a vehicle, comprising:
an occupant restraint webbing that corresponds with a thoracic region of an occupant seated at a vehicle seat;
an inflation portion that is provided at the occupant restraint webbing and that, at a time of inflation, corresponds with a cephalic region of the occupant;
an inflator configured to supply gas for inflation to the inflation portion;
a side impact sensor that detects or predicts a side impact;
a control unit that causes the inflator to operate on the basis of an output signal from the side impact sensor; and
an inflation-time cross-sectional shape regulation component that is provided at a shoulder portion of a seatback of the vehicle seat, through which the occupant restraint webbing passes, and that, by restraining inflation of the inflation portion to a vehicle lateral direction outer side at the time of inflation of the inflation portion, effects regulation such that a cross-sectional shape of the inflation portion is longest in a vertical direction;
wherein the inflation-time cross-sectional shape regulation component is a belt guide that elastically deforms or turns about a support point provided at the shoulder portion, due to inflation of the inflation portion, and that is configured to expand within a predetermined range in a direction away from the cephalic region of the occupant.

11. An airbelt apparatus for a vehicle, comprising:
an occupant restraint webbing that corresponds with a thoracic region of an occupant seated at a vehicle seat;
an inflation portion that is provided at the occupant restraint webbing and that, at a time of inflation, corresponds with a cephalic region of the occupant;
an inflator configured to supply gas for inflation to the inflation portion;
a side impact sensor that detects or predicts a side impact;
a control unit that causes the inflator to operate on the basis of an output signal from the side impact sensor; and an inflation-time cross-sectional shape regulation component that is provided at a shoulder portion of a seatback of the vehicle seat, through which the occupant restraint webbing passes, and that, by restraining inflation of the inflation portion to a vehicle lateral direction outer side at the time of inflation of the inflation portion, effects regulation such that a cross-sectional shape of the inflation portion is longest in a vertical direction;

wherein the inflation-time cross-sectional shape regulation component is an inflation-time regulation belt guide at which an inflation-time regulation guide hole is provided, the guide hole having an elliptical shape that is longer in the vertical direction than in a vehicle lateral direction, so as to regulate the cross-sectional shape of the inflation portion at the time of inflation, and an upper end of the inflation-time regulation guide hole is provided so as to extend to a position sideward of a headrest of even height therewith; and further comprising a normal-time regulation belt guide that is provided adjacent to and parallel to the inflation-time regulation belt guide, and at which a normal-time regulation guide hole is provided which regulates a winding direction of the occupant restraint webbing passing therethrough at times of normal use, and that is expanded by inflation of the inflation portion.

* * * * *